July 17, 1962 W. T. WAGNER 3,044,918
FLEXIBLE CELLULAR PRODUCT AND METHOD OF FORMING SAME
Filed June 20, 1957
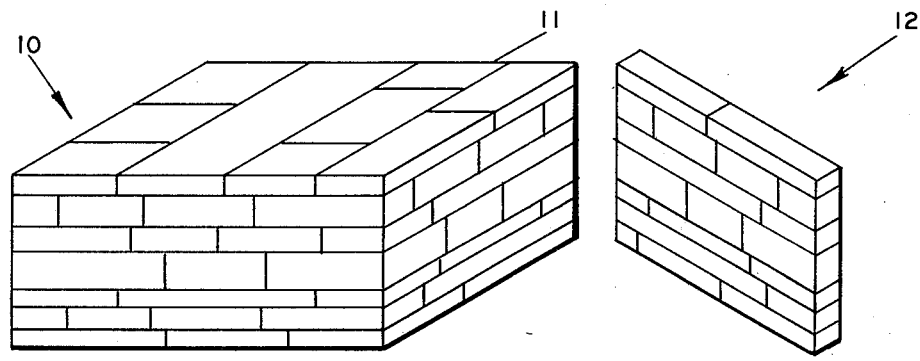
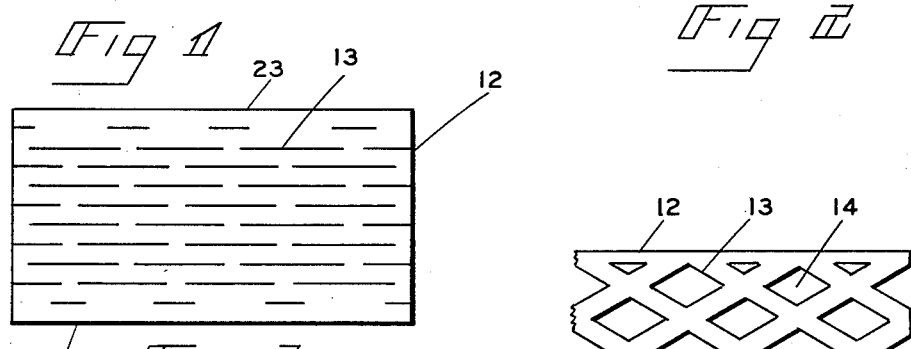
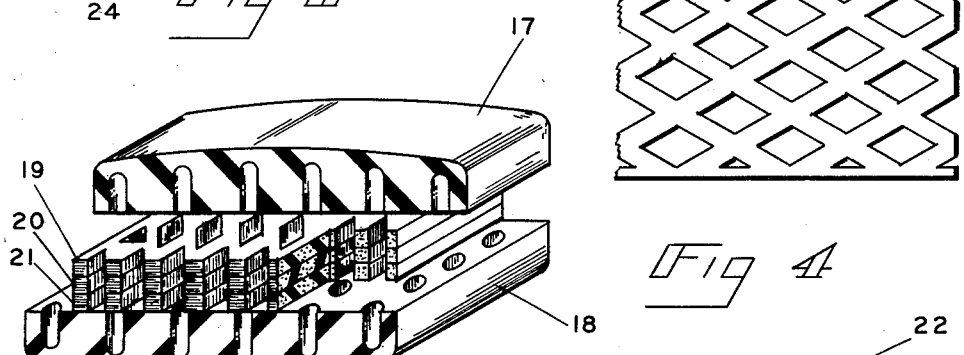
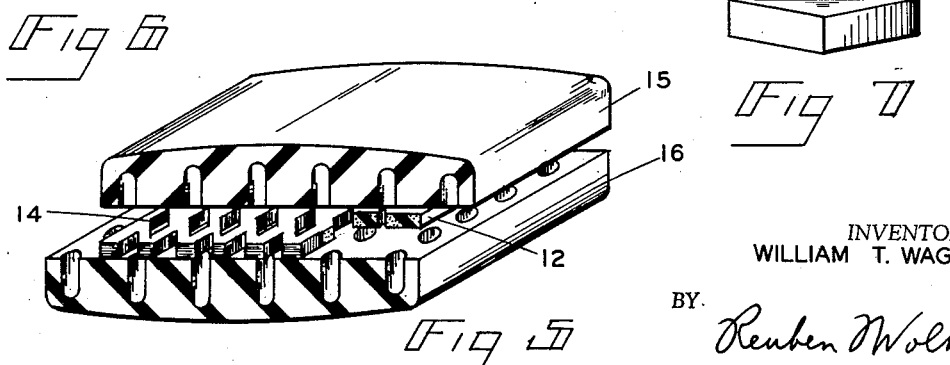
INVENTOR.
WILLIAM T. WAGNER
BY Reuben Wolk
ATTORNEY United States Patent Office 3,044,918
Patented July 17, 1962

3,044,918
FLEXIBLE CELLULAR PRODUCT AND METHOD OF FORMING SAME
William T. Wagner, Dayton, Ohio, assignor to Dayco Corporation, a corporation of Ohio
Filed June 20, 1957, Ser. No. 666,894
1 Claim. (Cl. 154—54)

This invention relates to flexible cellular products such as cushioning or other resilient elements. More specifically, the invention relates to such a product formed of outer layers and containing reinforcing sheets of flexible cellular material such as foam rubber, or foamed plastics. The invention further relates to a method of making this product.

Flexible cellular materials have long been used for the manufacture of cushioning materials such as those used for upholstery, mattresses, pillows and the like. Materials commonly used are foam rubber (also referred to as sponge rubber), foamed polyurethane, vinyl foam, and similar materials. It is common practice to improve the softness and decrease the weight of these materials by forming cavities or core pin holes in the cellular materials. In order to perform such an operation, special molds and handling techniques are required in addition to a great variety of molds to produce the desired size, shape and lightness. While such products have proved satisfactory in most ways, it has long been desired to manufacture similar products by using simpler methods. It is such a simpler method and its resultant product that is the subject matter of this invention.

In accordance with this invention it is found possible to produce openings or cavities in sheets of the cellular materials of the type referred to above. These cavities are formed by making slits or cuts in the sheets and then stretching the block in a direction normal to the direction of the slit in order to form the desired openings. The resultant expanded sheet may be used as an insert between outer layers of similar material to produce the final product. If desired, a plurality of these layers may be placed atop each other in order to produce the desired thickness, and these layers may be glued if desired. It has been found that the slits may be made in each individual sheet or may be made in a plurality of sheets after they have been placed together. In order to produce the sheets or blocks in an inexpensive manner, it has also been found possible to assemble segments and pieces of scrap cellular material and forming an overall block which may then be cut into sheets for final use in accordance with this invention. This method then provides an excellent way of utilizing materials which would otherwise be discarded.

It is a primary object of this invention to produce a cellular product that is resilient and flexible.

It is a further object of the invention to provide a method for manufacturing such a product.

Another object of the present invention is to provide a resilient cellular product having cavities or openings therein.

A further object of this invention is to provide a method of utilizing scrap pieces of flexible cellular material in the manufacture of cushioning materials.

Other objects of the invention will be apparent from the following specification and drawings in which:

FIGURE 1 is a view in elevation illustrating a block of assembled scrap pieces of cellular material.

FIGURE 2 is a view in elevation of a sheet which has been slit from the block of FIGURE 1.

FIGURE 3 is a top plan view of the sheet of FIGURE 2 with spaced parallel slits or cuts formed therein.

FIGURE 4 is a top plan view of the sheet of FIGURE 3 which has been drawn transversely of the slits to expand the slits into the openings shown.

FIGURE 5 is a perspective view in partial cross section illustrating the assembly of the sheet of FIGURE 4 in a furniture cushion.

FIGURE 6 is a view similar to FIGURE 5 except that a plurality of the sheets of FIGURE 4 have been substituted for a single sheet.

FIGURE 7 is a perspective view of a block which may be used to form the openings in the sheet.

As a first step in the invention a plurality of scrap pieces of cellular material 11 are assembled into a block 10 as shown in FIGURE 1. These pieces are illustrated as having a regular configuration such as would be found in the scrap ends of sheets or slabs of foamed material, but they may also be of irregular shapes. In order to form the block 10 the scraps may be sprayed or otherwise coated with a suitable adhesive such as rubber cement and pressed into a box or rectangular container. When the box has been filled, additional pressure is exerted to cause the cement to set and the result is a composite block of scrap material as shown. It is also understood, of course, that if desired the block may be one sheet of material if the size of the block to be used lends itself to such construction.

The block is now sliced by means of conventional machines into sheets of cellular material 12 as shown in FIGURE 2. These sheets may be of any desired thickness in accordance with the product to be manufactured.

The next step in the operation is to form a plurality of spaced parallel slits 13 in the sheet 12 as shown in FIGURE 3. The length of these slits is determined by the dimensions of the opening desired in the finished product and they are cut to pass completely through the sheet from top to bottom. The slits may be made by conventional cutting members such as blades by merely forcing them through the sheet by hand or machine. As previously mentioned the spacing and length of these slits is completely arbitrary and is selected in accordance with the desired product.

The next step of the operation is to form the slit sheet of FIGURE 3 into the expanded product shown in FIGURE 4, while expanding each slit into an aperture, and this may be done by an of several methods. In small operations, of course, a manual stretching may be utilized in which the ends 23 and 24 (the ends which are at right angles to the direction of the slits) are merely grasped by the hands and pulled. Additional pulling adjacent the individual slits may be necessary in order to provide the finished shape. The resultant openings 14 will pass through the narrowest dimension of the sheet, and will be approximately diamond-shaped as shown in FIGURE 4. Another method of expanding the sheet involves clamping the ends 23 and 24 of the sheet by means of conventional clamping devices, and moving the clamps away from each other by hand or by machine to produce the desired results. A third method of providing the openings involves the use of blocks 22 illustrated in FIGURE 7; these blocks may be inserted in the slits and result in cavities which are of the same shape as the blocks.

The composition of the cellular material also governs the condition of the material prior to slitting. In the case of foam rubber it is found that best results are obtained by partially or completely curing the rubber and allowing it to remain in the wet condition before the slitting just referred to has been accomplished. In such a case after the sheet has been expanded as described it is held in this expanded condition and exposed to heat to dry the material as well as to complete the cure thus setting the sheet into the expanded condition of FIGURE 4.

Certain cellular materials, however, may be treated by merely wetting the sheet prior to slitting or by slitting the sheet and wetting it prior to expanding. In either of the latter two cases, the sheet is held in the expanded condition and exposed to heat to dry and cure in the same operation.

When the expanded sheet has been cured and has attained its expanded condition permanently, it is ready for the next step of insertion between conventional outer upholstery covers. This is accomplished by applying adhesive, such as rubber cement, to both surfaces of the sheet and placing between the outer layers. The result is a highly resilient flexible cushioning member which has been made in an inexpensive fashion, in which the expanded sheet has become an intermediate or reinforcing layer.

It may be desired to form a cushioning member of greater thickness and in such a case a plurality of sheets may be placed atop one another and inserted between two other members. This is illustrated by FIGURE 6 in which three sheets 19, 20, and 21 are placed together to form the center member. The members 19, 20 and 21 may be placed together without adhesion or appropriate adhesives may be applied to each surface of each layer in order to cause an adhesion. The are then inserted between the outer layers 17 and 18 and formed into a permanent finished product as in the case of the FIGURE 5 device.

Of course it is understood that a single cellular sheet or a plurality of cellular sheets may be used directly on furniture without inserting between outer members such as shown in FIGURES 5 and 6. In such an event the sheets or sheets may be held in their permanent expanded position by tacks, upholstery tape, or adhesives. Such a use might arise for example in upholstering a chair that is to have a fairly thick surface cover to overcome the effects of the apertures.

It is understood that the invention is not limited by the specific modifications described above but the changes falling within the spirit of the invention may be made.

I claim:

A composite cushioning member comprising top and bottom layers of a flexible, resilient cellular material and at least one intermediate layer of similar material bonded therebetween having a plurality of diamond-shaped apertures passing through the narrowest dimension of said layer, the spacing and size of said apertures predetermined in accordance with slits previously formed in said material, said openings consisting of said slits in expanded form, said intermediate layer being maintained and bonded to said outer layers under sufficient tension to maintain the shape of said apertures.

References Cited in the file of this patent

UNITED STATES PATENTS

| | | |
|---|---|---|
| 1,088,551 | Dogny et al. | Feb. 24, 1914 |
| 2,198,724 | Schreiner | Apr. 30, 1940 |
| 2,294,478 | Norris et al. | Sept. 1, 1942 |
| 2,337,525 | Peik | Dec. 21, 1943 |
| 2,489,541 | Read | Nov. 29, 1949 |
| 2,493,032 | Rheinfrank | Jan. 3, 1950 |
| 2,656,291 | Doll et al. | Oct. 20, 1953 |
| 2,659,418 | Berman | Nov. 17, 1953 |
| 2,768,924 | Wright | Oct. 30, 1956 |

FOREIGN PATENTS

| | | |
|---|---|---|
| 15,913 | Great Britain | July 18, 1903 |
| 434,550 | Great Britain | Sept. 4, 1935 |

OTHER REFERENCES

Natural Rubber Bureau pamphlet, "Convert to Comfort with Latex Foam," entire pamphlet 21 pages, page 12 relied on. Received Div. 67, U.S. Patent Office, May 20, 1952.